US007220395B2

(12) United States Patent
Cooper, Sr. et al.

(10) Patent No.: US 7,220,395 B2
(45) Date of Patent: *May 22, 2007

(54) METHODS FOR THE PRODUCTION OF AMMONIA FROM UREA AND/OR BIURET, AND USES FOR $NO_x$ AND/OR PARTICULATE MATTER REMOVAL

(75) Inventors: Hal B. H. Cooper, Sr., deceased, late of La Canada-Flintridge, CA (US); by John Douglas Cooper, legal representative, Temple City, CA (US); Herbert W. Spencer, III, Valencia, CA (US)

(73) Assignee: EC&C Technologies, Inc., Santa Clarita, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 10/662,762

(22) Filed: Sep. 15, 2003

(65) Prior Publication Data

US 2004/0126294 A1    Jul. 1, 2004

Related U.S. Application Data

(60) Continuation of application No. 10/174,194, filed on Jun. 17, 2002, now Pat. No. 6,730,280, which is a continuation of application No. 10/023,040, filed on Oct. 22, 2001, now Pat. No. 6,506,350, which is a continuation of application No. 09/507,623, filed on Feb. 17, 2000, now Pat. No. 6,322,762, which is a division of application No. 08/822,932, filed on Mar. 21, 1997, now Pat. No. 6,077,491.

(51) Int. Cl.
B01D 53/56    (2006.01)

(52) U.S. Cl. .................... 423/235; 423/239.1; 423/358

(58) Field of Classification Search ............... 423/235, 423/239.1, 358
See application file for complete search history.

(56) References Cited

U.S. PATENT DOCUMENTS

| 3,862,815 A | 1/1975 | Mavrovic |
| 3,900,554 A | 8/1975 | Lyon |
| 3,922,222 A | 11/1975 | Van Moorsel |

(Continued)

FOREIGN PATENT DOCUMENTS

DE    23 62 887 A    6/1975

(Continued)

OTHER PUBLICATIONS

Patent Abstracts of Japan vol. 15, No. 031 (C-0798), Jan. 24, 1991 & JP 02 268811 A (Hitachi Zosen Corp), Nov. 2, 1990.

*Primary Examiner*—Wayne A. Langel
(74) *Attorney, Agent, or Firm*—Joseph E. Mueth

(57) ABSTRACT

This patent describes technology for generating ammonia from urea. The method is based on the hydrolysis of an aqueous solution of urea and/or biuret by heating under pressure to form a mixture of ammonia, carbon dioxide and water. The gas mixtures produced are useful for supplying ammonia at controlled pressure and rate of flow for many industrial applications without the risks and hazards associated with the transportation and on-site storage of ammonia, thereby providing a significant safety advantage over present industrial practice.

23 Claims, 7 Drawing Sheets

U.S. PATENT DOCUMENTS

| | | |
|---|---|---|
| 4,087,513 A | 5/1978 | Schell |
| 4,168,299 A | 9/1979 | Schell |
| 4,220,632 A | 9/1980 | Pence et al. |
| 4,308,385 A | 12/1981 | Goorden |
| 4,327,068 A | 4/1982 | Lagana et al. |
| 4,410,503 A | 10/1983 | Van Nassau et al. |
| 4,533,364 A | 8/1985 | Altman et al. |
| 4,652,678 A | 3/1987 | Douwes |
| 5,034,030 A | 7/1991 | Miller et al. |
| 5,096,599 A | 3/1992 | Granelli |
| 5,098,680 A | 3/1992 | Fellows et al. |
| 5,240,688 A | 8/1993 | von Harpe et al. |
| 5,252,308 A | 10/1993 | Young |
| 5,281,403 A | 1/1994 | Jones |
| 5,399,325 A | 3/1995 | von Harpe et al. |
| 5,543,123 A | 8/1996 | Hofmann et al. |
| 5,567,226 A | 10/1996 | Lookman et al. |
| 5,827,490 A | 10/1998 | Jones |
| 5,985,224 A | 11/1999 | Lagana |
| 6,077,491 A | 6/2000 | Cooper et al. |
| 6,093,380 A | 7/2000 | Lagana et al. |
| 6,322,762 B1 | 11/2001 | Cooper et al. |
| 6,506,350 B2 | 1/2003 | Cooper et al. |
| 6,730,280 B2 * | 5/2004 | Cooper et al. ............. 423/235 |

FOREIGN PATENT DOCUMENTS

| | | |
|---|---|---|
| DE | 202 537 A | 9/1983 |
| EP | A-0 487 886 | 6/1992 |
| JP | 08-057258 | 3/1996 |
| JP | 08-071372 | 3/1996 |
| WO | WO94/13391 | 6/1994 |

* cited by examiner

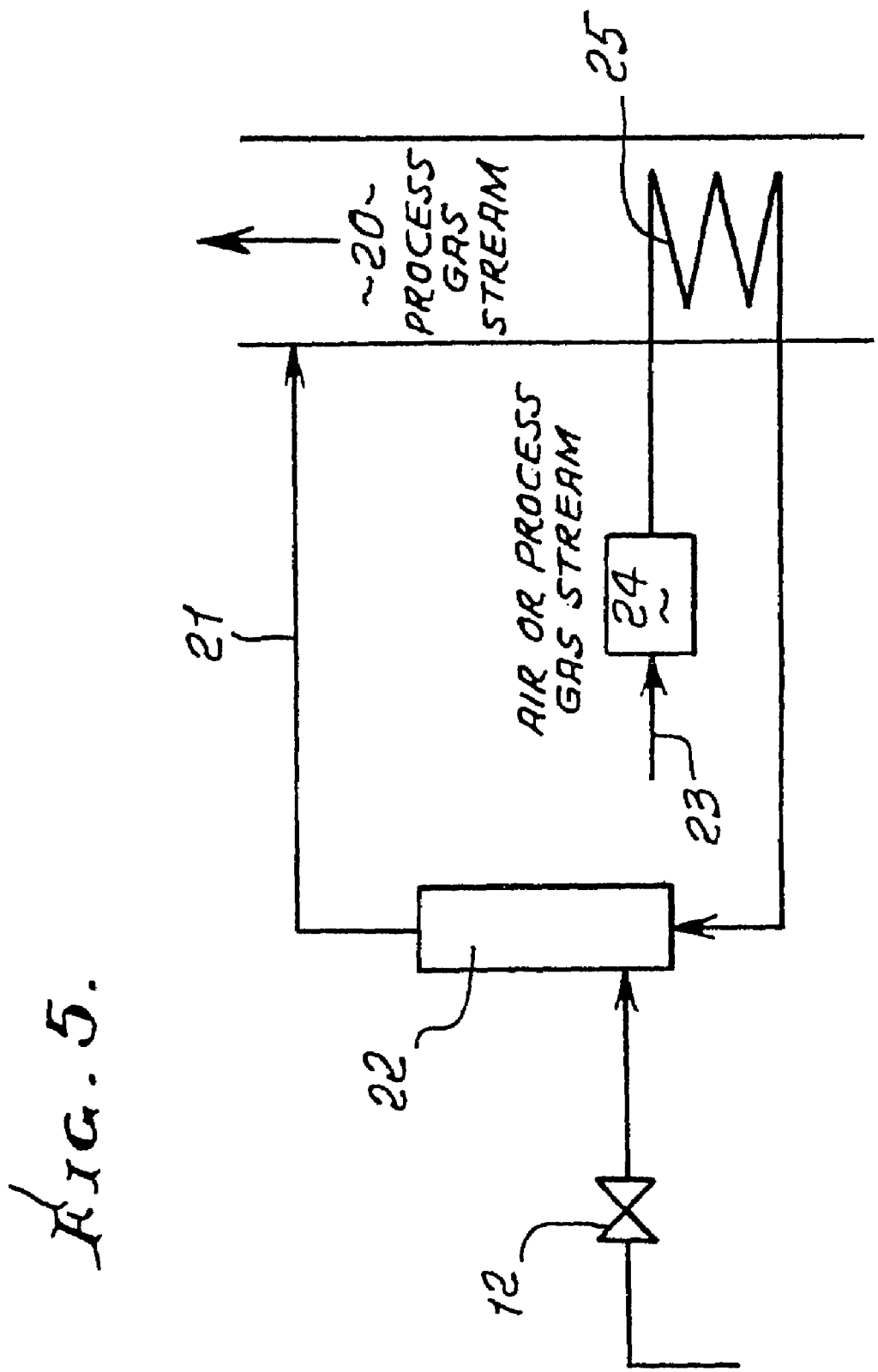

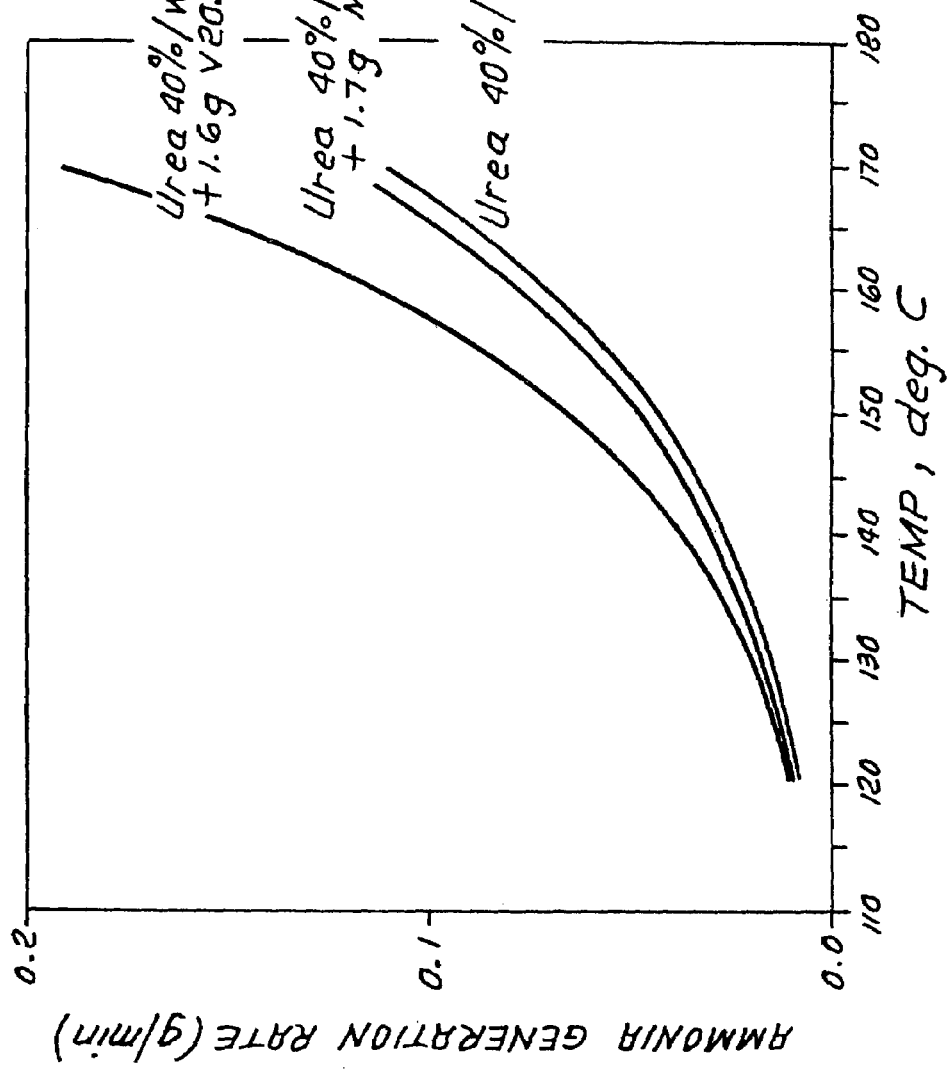

METHODS FOR THE PRODUCTION OF AMMONIA FROM UREA AND/OR BIURET, AND USES FOR NO$_X$ AND/OR PARTICULATE MATTER REMOVAL

The present patent application is a Continuation patent application of application Ser. No. 10/174,194 filed Jun. 17, 2002 now U.S. Pat. No. 6,730,280 which is a Continuation of application Ser. No. 10/023,040, filed Oct. 22, 2001, now issued U.S. Pat. No. 6,506,350 B2 which is a Continuation patent applicaiton of application Ser. No. 09/507,623 filed Feb. 17, 2000, now issued U.S. Pat. No. 6,322,762 B1 which is a Divisonal patent application of application Ser. No. Aug. 08/822,932 filed Mar. 21, 1997 now issued U.S. Pat. No. 6,077,491.

This invention was made with government support under Contract No. 68D50144 awarded by the Environmental Protection Agency. The government has certain rights in the invention.

The present invention relates to the generation of ammonia from urea and/or mixtures also containing biuret in which an aqueous solution of urea is heated under pressure in a reactor from which a gaseous mixture of ammonia, carbon dioxide and water is withdrawn at a controlled pressure and at a controlled rate of flow.

BACKGROUND

Ammonia is a highly volatile noxious material with adverse physiological effects, which becomes intolerable at very low concentrations and presents substantial environmental and operating hazards and risk. It is classified as a hazardous material and many precautions are required in transporting and handling it safely. Urea, on the other hand, is a stable, non-volatile, environmentally benign material that is safely transported, stored and handled without such risk and, accordingly, can serve as a safe source of ammonia. The processes of this invention minimize the risks and hazards associated with the transport, storage and use of anhydrous and aqueous ammonia.

Many industrial plants require the supply of large quantities of ammonia, which frequently must be transported through and stored in populated areas. Important users among these are industrial furnaces, incinerators and the electric power generation industry. All of these are faced with a lowering of the amount of nitrogen oxides being discharged to the atmosphere in the combustion gases being emitted from their operations, as required by environmental regulations. Another important use is for the so-called "conditioning" of flue gas by which an improved collection and removal of particulate matter (fly ash) is obtained.

One of the important methods for removing nitrogen oxides derived from the burning of fossil fuels embodies their conversion to inert nitrogen gas by reaction with amine-type reductant materials, by processes such as Selective Catalytic Reduction (SCR) or Selective Non-Catalytic Reduction (SNCR). Two main reductant materials have achieved commercial acceptance for this purpose, namely, ammonia and urea. Ammonia is superior to urea as such for SNCR in several important aspects for this application and is required for SCR applications but, as previously related, ammonia presents substantial environmental and operating hazards and risk because of its high volatility and noxious nature. Numerous accidents that have resulted in deaths have occurred in the transport and handling of ammonia and local authorities have placed restrictions on its use in many locations. Urea, on the other hand, is a stable, non-volatile, environmentally benign material that is safely transported, stored and handled without such risk.

This invention is particularly useful for supplying ammonia for the SCR and SNCR processes for removal of nitrogen oxide from combustion gases, the conditioning of flue gas for improving the removal of particulate matter, and other applications in which ammonia is used, by which the environmental hazards of transporting and storing anhydrous and aqueous ammonia solutions may be avoided.

In the SNCR method, ammonia, urea or amine-type materials are injected into the hot flue gas stream, usually in-furnace while in a temperature range of 2000° F.–1800° F. In the SCR method, ammonia is the only reductant used, and the reaction is carried out at a lower temperature level, typically 750° F.–600° F., the specific temperature level being controlled by the catalyst system used.

The chemical reaction taking place in the flue gas by which NO and NO$_2$ are removed is shown below for ammonia and urea:

Ammonia

$$4NO+4NH_3+O_2 \rightarrow 4N_2+6H_2O \qquad [1]$$

$$2NO_2+4NH_3+O_2 \rightarrow 3N_2+6H_2O \qquad [2]$$

Urea

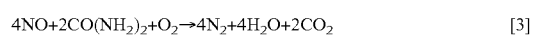
$$4NO+2CO(NH_2)_2+O_2 \rightarrow 4N_2+4H_2O+2CO_2 \qquad [3]$$

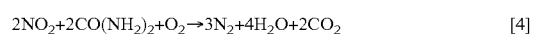
$$2NO_2+2CO(NH_2)_2+O_2 \rightarrow 3N_2+4H_2O+2CO_2 \qquad [4]$$

Compared to urea, ammonia is more reactive, is more easily dispersed uniformly into the flue gas stream and is active over a broader temperature range, as well as being more effective in efficiency. Urea, as such, while also an effective reductant, forms unwanted byproducts, such as carbon monoxide (CO) and nitrous oxide (N$_2$O), both of which are now under critical scrutiny by environmental authorities.

In the application of ammonia for the "conditioning" of flue gas, ammonia forms ammonium bisulfate with the sulfur oxides also present in the flue gas. These deposit and collect on the fine particles to form larger sticky agglomerates of the fly ash particles which makes their removal easier and more effective by both electrostatic collectors and fabric filters.

In this invention urea is converted to ammonia at the site where the combustion gases are being produced and there is no need to transport and store anhydrous ammonia or its aqueous solutions. Urea is the material that is shipped, stored and safely handled. The concept of this invention is also applicable to many other industrial uses of ammonia, such as pH adjustment, minimization of corrosion problems, heat treating of metal, etc.

The basic chemistry employed in the invention is a reverse of that employed in the industrial production of urea from ammonia and carbon dioxide and employs two reaction steps, as follows:

$$NH_2CONH_2 + H_2O \longrightarrow NH_2COONH_4 \qquad [5]$$
Urea　　　　Water　　　　Ammonium Carbamate

$$NH_2COONH_4 \longrightarrow 2\,NH_3 + CO_2 \qquad [6]$$
Ammonium Carbamate　　　Ammonia　　Carbon Dioxide The first reaction in which urea hydrolyzes to form ammonium carbamate is mildly exothermic, while the second, in which ammonia and carbon dioxide are produced is strongly endothermic, with the result that the reaction to release ammonia and carbon dioxide requires heat and quickly stops when the supply of heat is withdrawn. Excess water promotes the hydrolysis reaction, the overall reaction for which is as follows:

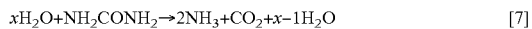

$$xH_2O + NH_2CONH_2 \rightarrow 2NH_3 + CO_2 + x-1H_2O \qquad [7]$$

In the thermal hydrolysis process of the invention, the liberation of ammonia commences at around 110° C. and becomes rapid at around 150° C. to 160° C., with or without catalytic assistance.

The generation of ammonia from urea is uniquely applicable to the control of nitrogen oxide emissions and the "conditioning" of combustion gas streams. The products of the hydrolysis are not foreign to those in combustion gas. The composition of combustion gas streams will typically have $H_2O$ concentrations ranging from 7% to 13% and $CO_2$ concentrations arranging from 6% to 14% with NO concentrations ranging from 20 ppm up to 2000 ppm. Hydrolysis of a 30% urea solution produces an off gas with a composition of 20.5% $NH_3$, 10.2% $CO_2$ and 69.3% $H_2O$ (Molar). Ammonia for both SCR and SNCR systems for NO control is injected at $NH_3$:NO ratios ranging from 0.5 to 2.0. With urea hydrolysis produced ammonia, the same $NH_3$:NO ratios are required and the accompanying $CO_2$ and $H_2O$ will add only a small amount of additional material compared to what is already present in the combustion gas stream, since NO concentrations in flue gas are on the order of 100 times less than their $CO_2$ and $H_2O$ content. The $CO_2$ and $H_2O$ added in the urea hydrolysis products will have no impact on the operation of the combustion process. There is also no major impact on the NO control system. Typically, ammonia is diluted with air, recycled flue gas, or steam prior to injection to insure a larger gas flow so as to provide a uniform distribution of the ammonia being fed to the flue gas for reaction with the nitrogen oxides. There must be a close stoichiometric matching and intimate mixing and molecular contact of the introduced ammonia with all of the nitrogen oxide molecules within a very short time. Otherwise, there will be either a discharge of unreacted ammonia and/or unreacted oxides of nitrogen in the off-gas. The treatment stream is typically introduced by distribution grids covering the entire cross-sectional flow area or by high velocity injection nozzles.

The prior art relating to the hydrolysis of urea has been mainly concerned with two areas of application: (1) a reduction in the amount of urea remaining in the low concentration waste streams produced in urea manufacture by its conversion back to ammonia and carbon dioxide under low pressure, which are then recovered and dehydrated and recycled back to the urea synthesis step, or (2) for the removal of nitrogen oxides from combustion gas streams by reaction with urea hydrolysates which are produced by a partial hydrolysis under high pressure of a urea solution, during which the ammonia formed is not released as generated and is held in solution while the urea is being heated and partially reacted.

The first of these, in which the urea in the dilute waste water streams discharged by urea manufacturing plants is converted to ammonia and carbon dioxide for recycle has been disclosed by Mavrovic in U.S. Pat. No. 3,826,815, Van Moorsel in U.S. Pat. No. 3,922,222 and Schell, in U.S. Pat. Nos. 4,087,513 and 4,168,299 None disclose the use of urea, as a source of ammonia for other uses, nor as a means of avoiding the hazardous aspects involved in the shipping and employment of ammonia in other industrial operations. In particular, there is no visualization of feeding a solution of urea to a reactor to produce a gaseous stream of ammonia, carbon dioxide and water which is generated at a controlled rate for use for other purposes than urea manufacture. No disclosure was made as to the incorporation of a urea hydrolysis step for producing ammonia for use in removing oxides of nitrogen by SNCR (Selective Non-Catalytic Reduction) or SCR (Selective Catalytic Reduction) processes from waste combustion gas streams, the "conditioning" of flue gas to improve particulate collection, or for other applications in which ammonia is employed. All of these recovery processes involve stripping and distillation devices for removal and concentration of the ammonia formed.

In the second group, von Harpe et. al. in U.S. Pat. No. 5,240,688, disclose a system and operating conditions for the partial hydrolytic decomposition of urea to produce ammonium salts and unreacted urea, all in solution form, that are useful for the reduction of nitrogen oxides in combustion gas streams, but not as a gaseous ammonia-containing product that is free of unreacted urea and ammonium carbamate.

The von Harpe patent is specifically directed to conditions for the SNCR (Selective Non Catalytic Reduction) process for NOx control. Operating conditions are selected such that hydrolysis products formed will be emitted from the system as ammonium salts, either by operating at pressures in excess of 1,200 pounds per square inch or by cooling the hydrolysis products to below 70° F. There is no suggestion about operating at the lower pressure levels of the present invention in which ammonia and carbon dioxide are emitted in gaseous form and which are also useable by SCR (Selective Catalytic Reduction) process systems and other processes needing ammonia gas.

The process of this invention where an aqueous solution of urea is continuously fed into a heated reactor and a continuous stream of gaseous ammonia, carbon dioxide and water produced and discharged without any urea or ammonium salts for use by both SCR and SNCR nitrogen oxides reduction processes, or for other uses of ammonia, is not disclosed by von Harpe.

Lyon in U.S. Pat. No. 3,900,554 describes a process in which ammonia is used to reduce nitrogen oxide concentrations in combustion exhaust gas streams for use with the so called SNCR (Selective Non-Catalytic Reduction) method. In U.S. Pat. No. 4,220,632, Pence, et. al. describes a process in which ammonia is used to reduce nitrogen oxides in combustion exhaust gas in the presence of a catalyst by the SCR (Selective Catalytic Reduction) process.

Jones, in U.S. Pat. No. 5,281,403, describes a method for removing nitrogen oxides from a combustion gas stream in which a solution of urea is partially hydrolyzed by passage of a urea solution in an injection lance which is heated directly by the hot combustion gas stream containing the nitrogen oxides into which the lance is inserted, while keeping the urea hydrolysis products in the liquid phase in the presence of a conversion catalyst, and then injecting the partially converted urea solution from the lance system into the combustion gas. The Jones patent is directed to the higher temperature (1800–2000° F.) SNCR process and does not produce a gaseous ammonia-containing product stream free of unreacted urea that can be used directly in both the SNCR and the lower temperature SCR processes, as by the present invention. Jones teaches that high pressures of greater than 900 psig are required to keep the ammonia formed in the hydrolysis reaction in solution and that conversions of greater than 90% may be obtainable, whereas the present invention operates effectively at much lower pressures, of only 20 to 500 psig, and preferably at 60 to 150 psig. Ammonia and carbon dioxide are readily released in gaseous form from the liquid media under these conditions with urea and biuret conversions reaching 100%. The systems of Jones and others do not consider the presence or hydrolysis of biuret, which is present in essentially all regular commercial grades of urea, nor provide for a controllable continuous supply of gaseous ammonia and carbon dioxide for feeding to a nitrogen oxides emissions control useable by the SCR method, nor for other industrial uses requiring ammonia.

Jones also describes in his FIG. 4 a loop system for generating ammonia vapor in which the urea containing solution is hydrolyzed under high pressure conditions in order to keep the ammonia formed in solution in the catalyst chamber, until the pressure is subsequently released by flashing to a lower pressure through a pressure relief valve, but with no control of the gas pressure or gas flow. Such a system does not provide a suitable means for controlling the ammonia flow to meet the demanding control requirements of $NO_x$ control systems and other process requiring that the supply of ammonia be at a rate which essentially matches the up-take rate of the $NO_x$ or other component being reacted, nor show or teach the necessity of keeping the ammonia and carbon dioxide product vapor mixture heated for feeding to the $NO_x$ control system. The loop system described by Jones utilizes a two step system for heating and reacting, comprised of an initial heat exchanger and a following conversion catalyst chamber, both of which are under high pressure. This means that the substantial amount of heat required for carrying out the endothermic hydrolysis reaction to release ammonia must be contained in the circulating liquid stream as sensible heat prior to being brought into the catalyst reaction chamber where the endothermic reaction heat is required for the hydrolysis to proceed. Accordingly, a very large amount of liquid must be pumped up to the high operating pressure specified and the need to heat the solution to a substantially higher temperature than with the present invention, which supplies the heat required at a lower temperature directly where the endothermic reaction is occurring and does not suffer the high pumping cost for recompressing the circulating liquid, thereby avoiding both of these problems and the high costs involved for so doing.

Another consideration with the process of Jones is the matter of his catalysts, their life and the manner of their use. All of the catalyst salts or oxides indicated will tend to be decomposed or solubilized by continuous contact with hot ammonia containing liquid streams. Ammonia is a powerful solvent, particularly at high pressures and temperatures around or above its critical temperature. The actual chemical composition of the catalysts employed is not identified or specified, other than by an elemental name. Salts of vanadium, chromium and molybdenum are classified as toxic and their discharge into flue gas streams would be severely restrained from an environmental viewpoint. In their metallic form, these elements were not found to show significant catalytic activity.

Young in U.S. Pat. No. 5,252,308 describes a two-step acidic chemical process for converting urea to produce ammonia that employs polytropic acids, such as $H_3PO_4$. The safety advantages of on-site ammonia generation are pointed out and that ammonia generated by this method can be used for the removal of nitrogen oxides from combustion gas. His two-step acid process, however, is substantially more complicated in its equipment requirements and method of operation, and is not readily adapted to meet the critical rate of ammonia generation required. The ammonia is contacted with the combustion gases at a pressure and rate consistent only with the reaction rate at the reaction temperature. The pressure during ammonia evolution is not controlled or maintained at any set elevated level. The application of the process to the removal of nitrogen oxides by the SCR type process, or for the "conditioning" of flue gas to give improved removal of fine particulate matter, is not disclosed.

Miller and Laudal in U.S. Pat. No. 5,034,030 describe a process for flue gas conditioning applied to fabric filtration in which ammonia gas and sulfur trioxide are injected for improved performance of a fabric filter. Ammonia gas and sulfur trioxide have also been used for conditioning of electrostatic precipitators as discussed in U.S. Pat. No. 4,533,364, Altman, et. al. Dismukes also describes the conditioning of fly ash with ammonia. Lookman, et. al. in U.S. Pat. No. 5,567,226 discuss the controlled injection of ammonia for improving the performance of particulate control devices.

SUMMARY OF INVENTION

The method of removing nitrogen oxides from combustion gas streams by SNCR (Selective Non-Catalytic Reduction) and SCR (Selective Catalytic Reduction) processes, the improvement which comprises heating an aqueous solution of urea, or mixtures of urea containing biuret, or ammonium carbamate on site, to produce a gaseous ammonia-containing product under controlled pressure and rate of flow, said gaseous ammonia-containing product being essentially free of urea, biuret, or ammonium carbamate, and contacting said ammonia-containing product with the nitrogen oxides in said combustion gas streams.

A preferred method of this invention includes producing a gaseous ammonia-containing product from urea, or mixtures of urea containing biuret, or ammonium carbamate, said ammonia-containing product being essentially free of urea, biuret, or ammonium carbamate, the process comprising;

a) Feeding an aqueous solution of urea, and/or mixtures containing biuret, in a concentration range of about 1% to about 76% solids, to a reactor in which it is heated to a temperature of at least about 110° C. but less than about 200° C. and operated at a pressure of at least about 20 PSIG but less than about 500 PSIG, and therein hydrolyzing the urea and biuret to produce a gaseous product stream of ammonia, carbon dioxide and water;

b) Separating the gaseous ammonia and carbon dioxide formed from the liquid aqueous reaction media at the operating pressure;

c) Retaining the liquid phase reaction media in the reactor for further conversion of unreacted urea, biuret and intermediate ammonium carbamate to gaseous ammonia and carbon dioxide, and/or recycling a portion of the reaction media back into the reactor or feed solution to the reactor for further conversion; and d) Withdrawing the gaseous ammonia and carbon dioxide-containing product stream separated in Step b) at a controlled pressure and controlled rate of flow for external use.

In another aspect, the invention is applicable to the removal of fly ash from combustion gas streams. This aspect includes the method in which sulfur oxides and ammonia are added to combustion gas streams to obtain better removals of fine particulate matter by baghouses or electrostatic precipitators, the improvement comprising producing the ammonia under controlled pressure and rate of flow from urea, biuret, or ammonium carbamate, and mixtures thereof, as a gaseous mixture of ammonia and carbon dioxide, and contacting said ammonia with sulfur oxides and particulate matter in said combustion gas stream.

The present invention relates to the generation of gaseous ammonia from urea and/or mixtures containing biuret. The process involves the hydrolysis of an aqueous urea-containing solution that is heated under pressure in a reactor from which a gaseous product mixture of ammonia, carbon dioxide and water is withdrawn. The method minimizes the risks and hazards associated with the transport, storage and transfer of anhydrous or aqueous ammonia solutions by virtue of their production from urea at the point of use.

The process of the present invention, in its preferred form, injects an aqueous solution of urea having a concentration of about 10% to about 50% by weight of urea into a hydrolysis reactor. The hydrolysis reactor is typically operated at temperatures of about 125° C. to about 180° C. and gas pressures from about 20 psig to about 200 psig with a liquid residence time such that the off-gas product comprising ammonia, carbon dioxide and water vapor is withdrawn as a gas at a controlled pressure and controlled rate of flow, said off-gas being maintained above about 60° C. In its overall context, feed concentrations of about 1% to about 77% urea may be used, with temperatures between about 110° to about 300° C. and operating pressures of about 30 psig to about 500 psig. The temperature and gas pressure are controlled by the input of heat to the reactor.

In a typical system the heat input is controlled to maintain a constant pressure in the reactor and temperature is a dependent variable. As gas is withdrawn, the pressure would drop but for the addition of heat at a rate which is required to maintain the pressure at a constant level.

In general, a controlled rate of flow of ammonia being produced refers to a generally constant or steady rate of ammonia production. As used herein, it also refers to the contacting of a combustion gas stream containing $NO_x$, sulfur oxides or fly ash which is approximately equated or balanced to the demands of the combustion gas stream, that is, the ammonia produced is sufficient to react with the component or components in the gas stream being removed, or reacted with.

A precaution that must be observed in the use of urea hydrolysis products is that the product gas stream must be maintained at a temperature above about 60° C. in order to avoid the deposition of solid ammonium salts which form at lower temperatures—salts such as ammonium carbonate and ammonium bicarbonate. These deposits are readily decomposed and re-vaporized by heating the distribution system to above about 60° C.

The pressure may be measured on either the liquid side or gas phase side of the reactor. When measured on the gas side the pressure gauge is heated to above 60° C. to prevent the deposition of solids in the gauge. On the liquid side the pressure gauge can operate at ambient temperature or at temperatures up to the temperature of the solution. Emergency pressure relief can be on either the gas side or the liquid side of the reactor. In both cases the vent can be connected to a water containing dump tank to trap ammonia gas and prevent its release to the atmosphere. Dumping hot reactor solution into a quantity of water (temperature less than 40° C.) equal to or greater than the solution in the reactor stops the hydrolysis process and prevents the further generation of ammonia. A pressure release valve on the gas phase side is heated to above about 60° C. to insure that solids do not build up in the valve.

The rate of the hydrolysis reaction may be enhanced over that of water alone by the addition of certain materials to the aqueous reaction media. These include: (1) oxides and the ammonium and alkali metal salts of Groups III-B, IV, V and VI-A of the Periodic Chart Of The Elements, among which are vanadium oxide, ammonium vanadate, molybdenum oxide, ammonium molybdate, chromium oxide, ammonium chromate, ammonium borate, and other elements falling within these groups, (2) the hydroxides, carbonates and bicarbonates of Group I (e.g., KOH and NaOH) and (3) certain active surface solids, including activated carbon, silica or alumina, and ion-exchange resins in their acidic or basic forms. In this invention the enhancer materials remain in the reaction media and are not discharged. These higher rates, however, may also be obtained by a moderate increase in temperature and pressure with water alone.

BRIEF DESCRIPTION OF THE DRAWINGS

FIG. 4 is a schematic showing the arrangement and method of operation in which the gaseous reaction products are discharged from the reactor as a mixed liquid-gas stream.

FIG. 5 is a schematic of the equipment arrangement by which the product ammonia and carbon dioxide stream is diluted.

FIG. 7 is a graph comparing the rate of hydrolysis of urea with water alone, and with either added vanadium oxide or molybdic oxide.

DESCRIPTION OF PREFERRED EMBODIMENTS

Figure 1:
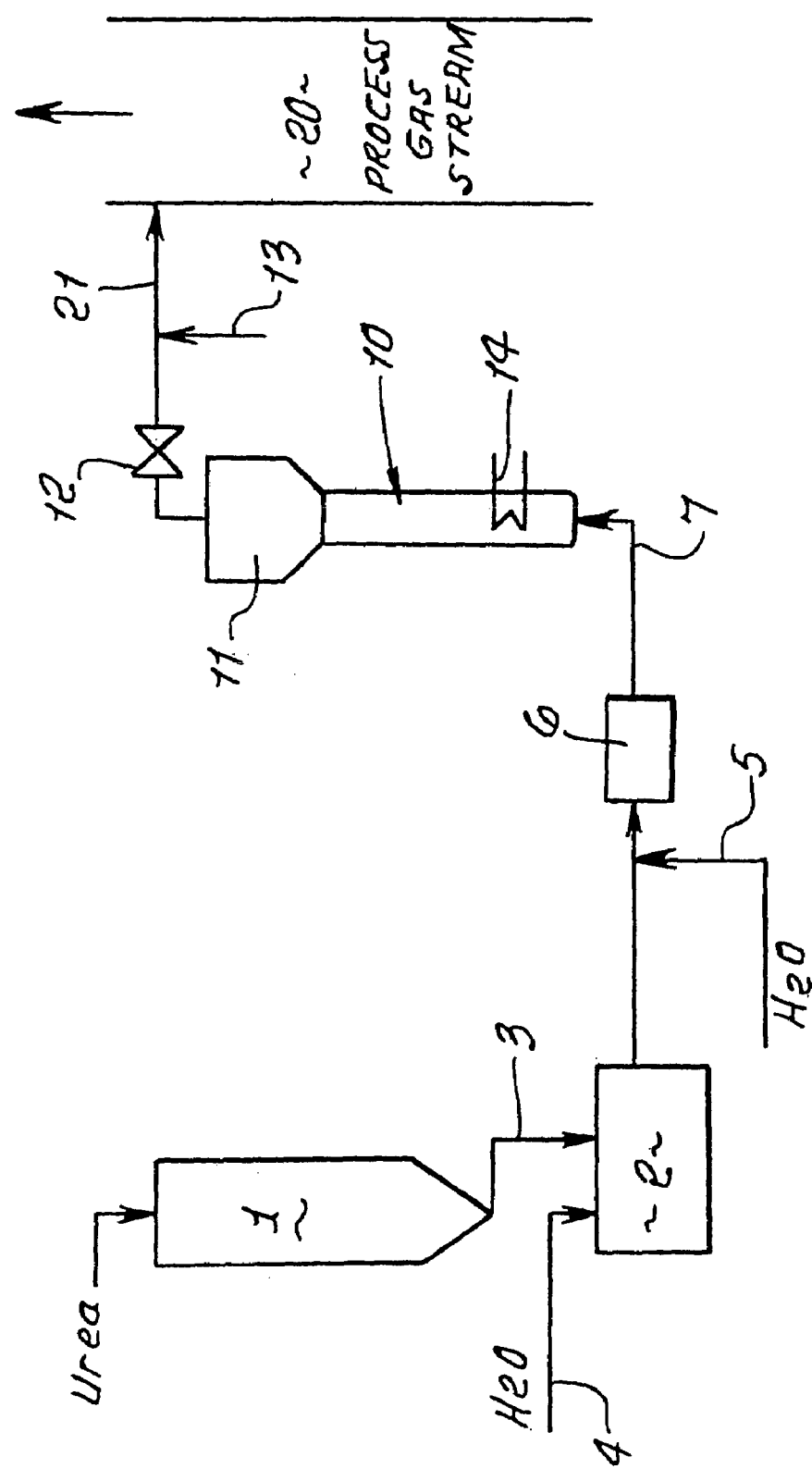
FIG. 1 is a schematic illustrating one embodiment of the process for producing an ammonia gas stream from solid urea.

FIG. 1 illustrates one version of the hydrolysis process and the arrangement of its component parts by which a urea-free ammonia gas stream is produced from solid urea. In this version, the gaseous ammonia-containing product formed is separated from the liquid phase aqueous reaction media remaining within the hydrolysis reactor, the contents of which are mainly comprised of unreacted urea, ammonium carbamate, water, and a lesser amount of biuret. As shown, the urea feed, line 3, is supplied as a dry solid from bin 1. The urea from this is fed into a dissolver 2 to which makeup water is supplied from line 4 in an amount to solubilize the urea. The urea solution formed is further adjusted to the desired concentration for feeding to the hydrolysis reaction by the addition of additional water introduced through line 5. The solution is then pressurized by pump 6 for injection through line 7 into the hydrolysis reactor 10, in which the urea is converted to ammonium carbamate, ammonia and carbon dioxide upon heating under pressure. The heating may be provided by various means known to those familiar with the art, such as by internal or external heat exchange, as shown by heater 14. A particularly useful way is with an internal pipe coil using steam or a hot heat transfer fluid. The heat input is adjusted to maintain the desired operating temperature and pressure to supply ammonia at the rate required.

The contents are held at a constant volume by a liquid level controller which controls the urea feed pump and maintains a space above the aqueous liquid reaction media for the gaseous ammonia and carbon dioxide products to separate from the liquid. An expanded section 11 of the hydrolysis reactor 10 can be used to aid in the separation of the product gases from the liquid solution and prevent carryover of unreacted urea by entrainment and/or foaming. Unreacted urea and/or biuret and intermediate ammonium carbamate remain in the reactor in the liquid reaction media for eventual conversion. A back pressure valve 12 is used to maintain pressure in the reactor and control the flow of the gaseous products being removed. The gaseous ammonia and carbon dioxide are discharged at a controlled rate to match the needs of the nitrogen oxides removal, flue gas "conditioning", or other applications. The ammonia-carbon dioxide stream is customarily diluted with a carrier gas, such as compressed air, steam or flue gas, or mixtures thereof, introduced through line 13, before discharge into the flue gas flowing in duct 20, in order to aid in obtaining a better distribution of the ammonia into the flue gas stream, such as for reaction with nitrogen oxides. The gas leaving the reactor is not allowed to cool below 60° C. in order to prevent solids deposition from ammonium carbonate/bicarbonate formation, or until it is diluted enough to prevent such happening.

Figure 2:
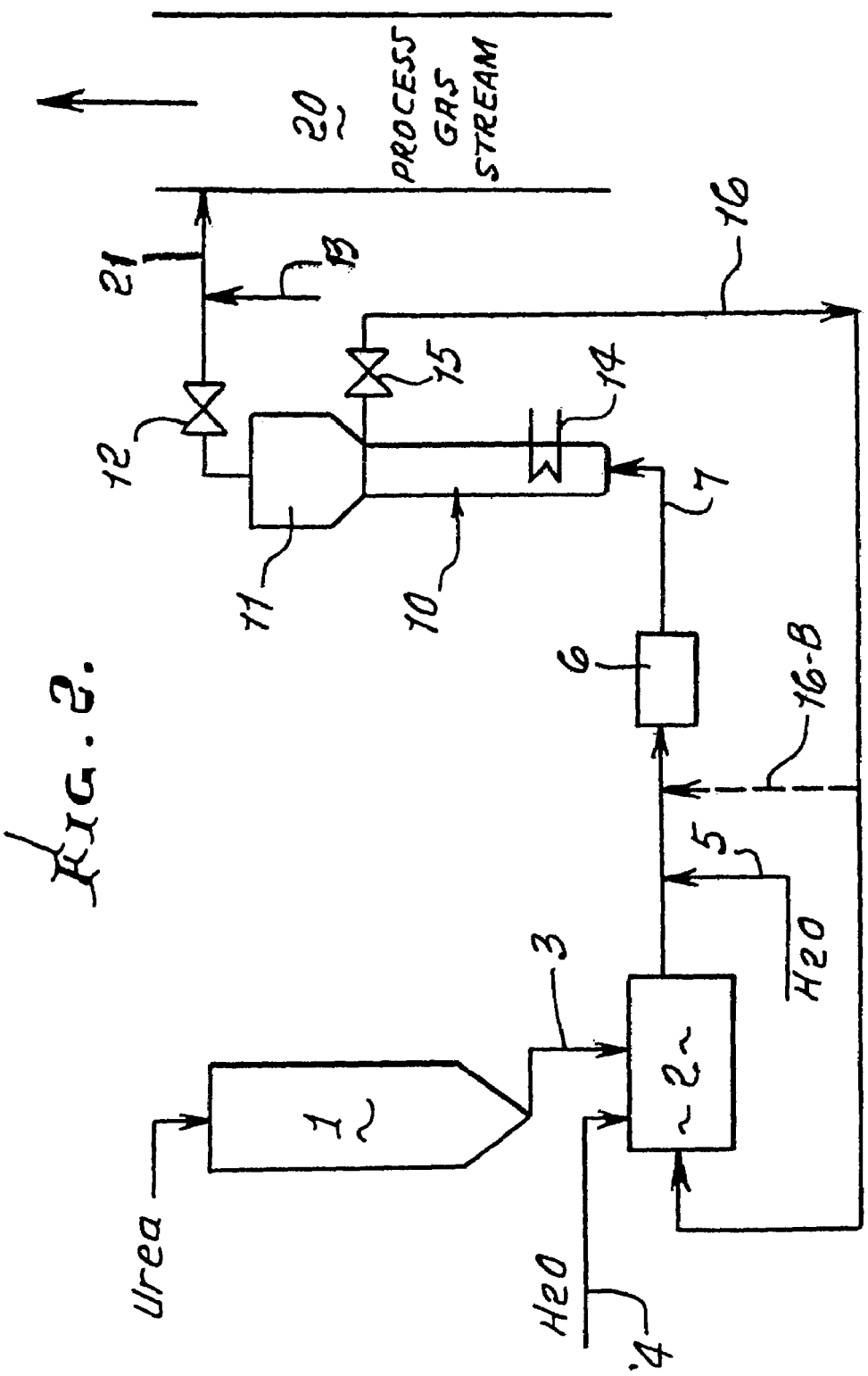
FIG. 2 is a schematic illustrating a version of the process equipment arrangement for separation of the gaseous products formed from the liquid reaction media in the hydrolysis reactor.

FIG. 2 illustrates another version of the process equipment arrangement designed to provide good separation of the gaseous ammonia and carbon dioxide hydrolysis products formed from the liquid reaction media in the hydrolysis reactor by use of an overflow takeoff line to maintain a constant level of the reaction media, through which a portion of the liquid reaction media is removed and recycled back through line 16 to the urea feed dissolver 2, or into the feed to pump 6 through line 16-B. Control valve 15 prevents the discharge of product gas through the liquid recycle line and controls the rate of flow through line 16. The process is operated in a manner similar to that described for FIG. 1. The recycled reaction media leaving through line 16 is comprised mainly of the unreacted urea, ammonium carbamate, dissolved ammonia and water.

Figure 3:
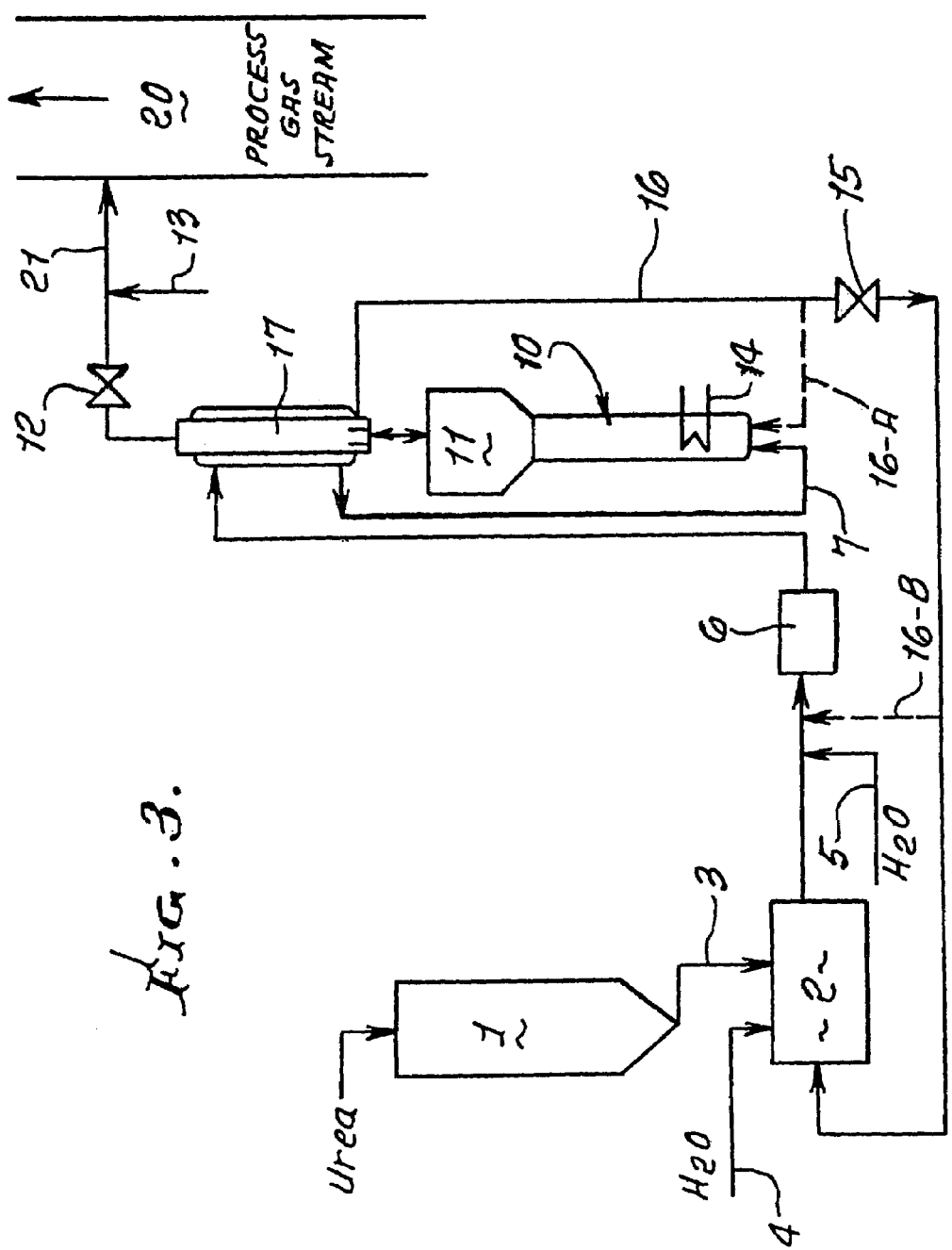
FIG. 3 is a schematic showing a version of the process equipment arrangement for reducing the amount of water carried away in the product gas stream.
Figure 9:
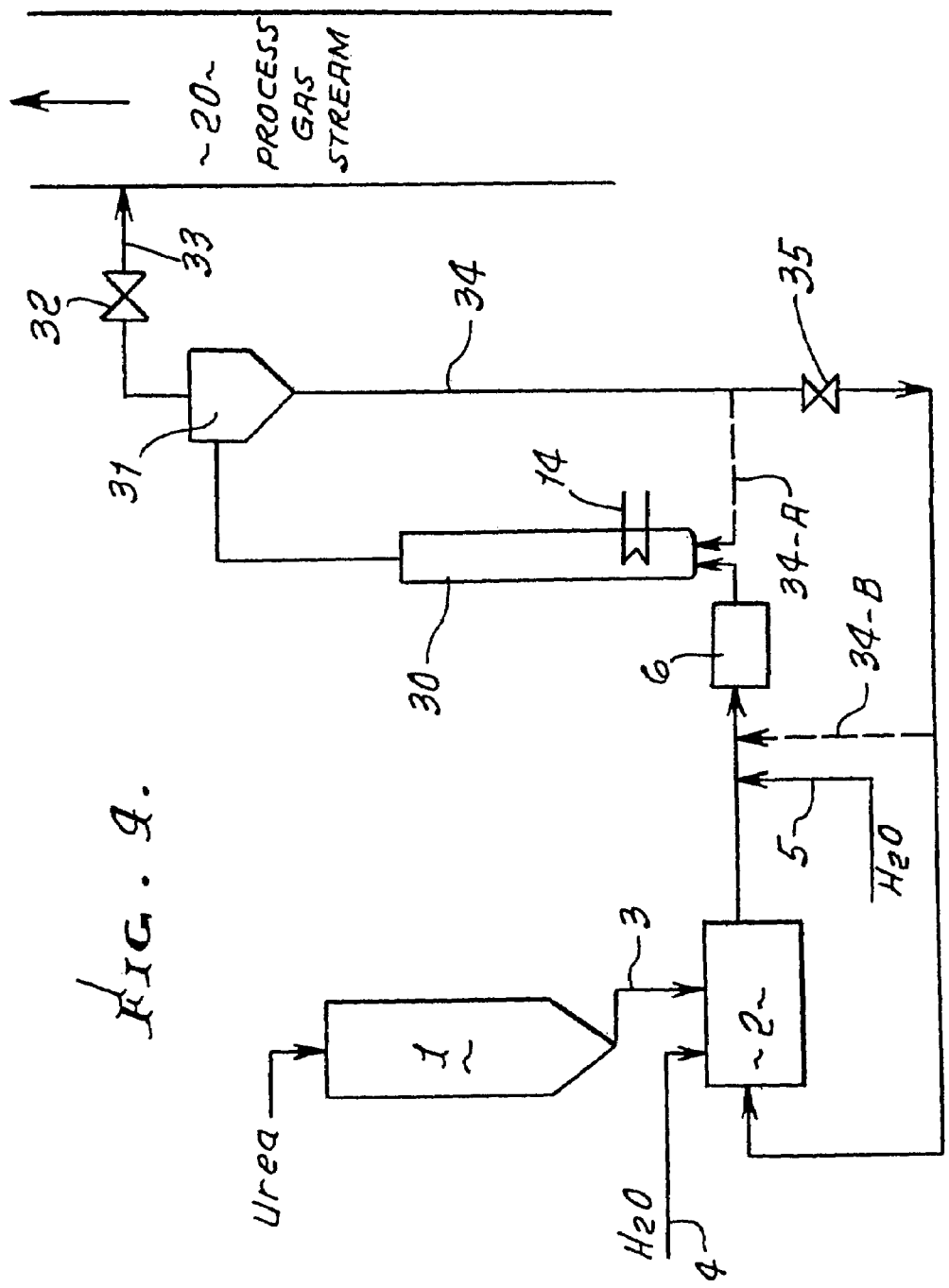

FIG. 3 shows an equipment arrangement which reduces the amount of water carried away in the product gas stream. In this arrangement, a condenser 17 is located in the vapor line leaving the hydrolysis reactor 10 which condenses and removes a substantial portion of the water that is carried along with the product gaseous ammonia and carbon dioxide stream in line 21 leaving the hydrolysis reactor 10. The condensed water is separated and removed in line 16. This not only removes a substantial portion of the water from the gaseous ammonia and carbon dioxide product stream, but reduces the water requirements of the system. The condensate in line 16 may be returned to the system at various optional points. It may be recycled to the bottom of the hydrolysis reactor 10 through line 16-A, to replace dilution water normally introduced through line 5 at line 16-B, or to the urea dissolver 2 to replace a portion of the solution water normally introduced in line 4. Control valve 15 prevents the discharge of gas and allows only liquid to pass. The condenser 17, control valve 12 and off-gas product line 21 are not allowed to cool below 60° C. in order to avoid deposition of ammonium carbonate solids. The heat requirements for the hydrolysis reaction system may also be reduced by using the urea feed stream from pump 6, prior to its entrance into the reactor 10, as the coolant to the condenser 17, following which the heated feed stream in line 7 is delivered to the reactor 10.

FIG. 4 shows another arrangement and method of operation in which the hydrolyzed reaction products are discharged from heated reactor 30 as a mixed liquid-gas stream and there is no separation of the gaseous reaction products within the reactor body. The liquid reaction media and gaseous product stream pass from reactor 30 and are discharged into a separator 31 also under pressure. The gaseous product stream is removed at a controlled rate through control valve 32 in line 33, and the separated liquid phase reaction media recycled through line 34. Control valve 35 allows only liquid phase to pass. The discharged liquid media can optionally be recycled back to reactor 30 through line 34-A by gravity, or fed to the suction side of reactor feed pump 6 through line 34-B. In another option, the liquid media in line 35 can be recycled back to urea dissolver 2. via line 34.

The gaseous ammonia, carbon dioxide and water vapor leave via line 33 and are fed at a controlled rate through control valve 32 into the process gas stream gas in duct 20. The control valve and off-gas piping are heated to a temperature above 60° C.

FIG. 5 shows an equipment arrangement by which the product ammonia and carbon dioxide stream is diluted, that is particularly useful for the removal of nitrogen oxides by the SCR and SNCR methods, or the "conditioning" of flue gas to give improved particulates removal. In this, the product gas stream from the hydrolysis reactor, controlled by valve 12 or 32 discharges into mixer 22 into which a stream of compressed air, steam or combustion gas, or mixtures thereof, is introduced simultaneously. The increased gas volume and lower concentration of the diluted ammonia treating gas makes for a better distribution and commingling of the ammonia and the intimate mixing and contact needed for contacting and reaction with all of the nitrogen oxides molecules or fine particulates in the combustion gas stream. Typically, the ammonia gas feed stream is distributed into the combustion gas stream by means of an injection grid with multiple feed points extending over the cross-sectional flow area of the duct or by multiple high pressure injection nozzles. With this arrangement, the dilution gas is air which is introduced through line 23, is compressed by compressor 24 and then heated in heat exchanger 25 located in hot gas duct 20 prior to its introduction into contactor 22.

Figure 6:
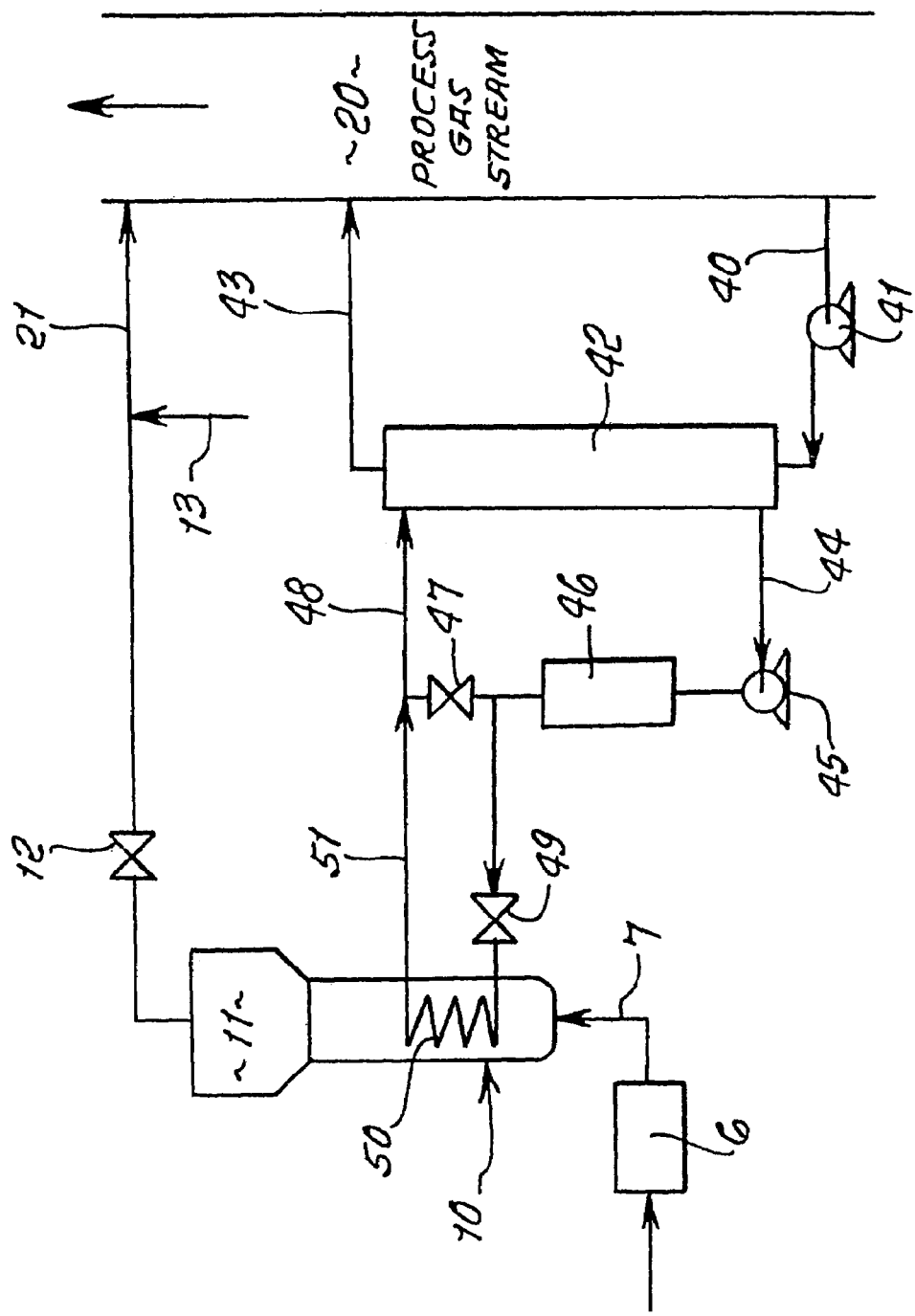
FIG. 6 is a schematic showing an arrangement by which a hot combustion gas stream may be used to heat the hydrolysis reaction.

FIG. 6 shows an arrangement by which the hot combustion gas stream may be utilized to supply the heat requirements of the endothermic hydrolysis reaction and thereby eliminate the requirement for an outside or separate source of heat, such as steam or hot oil. A sidestream of the hot flue gas in duct 20 is delivered through line 40 to blower 41 from which it passes through heat exchanger 42 in which it heats a circulating heat transfer fluid and exits back into the flue gas stream in line 43. The heated heat transfer fluid leaves through line 44 and re-enters exchanger 42 in line 48. The hot heat transfer fluid in line 44 is circulated by pump 45 through buffer tank 46 from which a portion is delivered to reactor 10 through control valve 49 at a rate as required by the hydrolysis reaction taking place in reactor 10, in which heat is transferred through internal heat transfer coil 50 to the urea hydrolysis reaction media. The cooled heat transfer fluid leaves heat transfer coil 50 in reactor 10 through line 51. The cooled fluid then joins the overflow from surge tank 46 exiting through pressure control valve 47 and returns to heat exchanger 42 for reheating.

The heating of reactor 10 may also be provided by an exchanger located externally to the hydrolysis reactor. Such a means may be used for heating the hydrolysis reactor as shown in the systems of FIGS. 1, 2, 3 and 4, and/or dilution gas of FIGS. 5 and 6. Various of the individual equipment features, configurations and modes of operation described in the foregoing may be utilized in other arrangements.

The following Examples are for purposes of illustration.

EXAMPLE 1

A test reactor for determining the rate of the hydrolysis reaction versus temperature for the thermal hydrolysis method for converting urea to ammonia was constructed of ¾-inch diameter by 12-inch long pipe with an expanded upper section similar to that shown in FIG. 1. The lower section is heated externally and a pressure gauge is located at the top of the expanded upper disengaging section.

Tests were conducted at a number of different concentrations of urea in water to determine the effect of urea concentration on the rate of the hydrolysis reaction. Solutions were introduced into the lower section of the hydrolysis reactor and heated progressively to higher temperature levels in a batch mode of operation. The ammonia and carbon dioxide generated build up the gas pressure as the temperature is increased above 125° C. Below 125° C. the rate of reaction is very slow. Table 1 shows the effect of temperature on the rate at which the hydrolysis reaction proceeds for several urea concentrations (as ammonia generated) and the effect of an additive reaction rate enhancing material—Vanadium Pentaoxice ($V_2O_5$)—on the reaction rate, when operated in a batch mode.

TABLE 1

Temperature- Urea Concentration - Ammonia Generation

| Solution | Temperature (° C.) | Reaction Rate-(g/min. Ammonia) | |
|---|---|---|---|
| | | No Enhancer | 1.6 g $V_2O_5$ Added |
| 10 g Urea/ | 125 | .014 | .017 |
| 100 g H2O | 135 | .027 | .035 |
| | 145 | .051 | .067 |
| | 155 | .094 | .124 |
| 20 g Urea/ | 125 | .016 | .021 |
| 100 g H2O | 135 | .032 | .042 |
| | 145 | .061 | .081 |
| | 155 | .113 | .149 |
| 40 g Urea/ | 125 | .022 | .028 |
| 100 g H2O | 135 | .043 | .056 |
| | 145 | .089 | .107 |
| | 155 | .150 | .198 |

EXAMPLE 2

A graphical comparison of the data presented in Example 1 shows the rates of hydrolysis for urea with water alone, with vanadium oxide ($V_2O_5$) and molybdic oxide ($MoO_3$), is shown in FIG. 7. The addition of vanadium oxide to the reaction media enhances the rate of the hydrolysis reaction, as shown by the data of Example 1. Vanadium pentaoxide, or its salts, shows the greatest effect in increasing the rate of reaction, both as to the kindling temperature for the reaction and over the entire temperature range. The enhancement, however, can be equaled by a modest increase in temperature for the water system alone.

The rate of the urea hydrolysis reaction is also enhanced to varying degrees by the addition of other elements selected from Groups II I-B, IV, V and VI-A of the Periodic Chart Of The Elements to the reaction media. In their elemental metallic form, there is no significant increase over that of water alone. Materials showing enhancing activity include the oxides and ammonium and alkali metal salts of molybdenum, chromium, tin, bismuth, boron, and certain active surface solid materials, such as activated carbon, activated silica and activated alumina, and ion-exchange resins in their acid and basic forms. The solids not dissolved among these may be used in either suspended or fixed positions.

Reaction rates are further increased by operation at elevated pH levels (above pH=10), as obtained by the addition of alkali metal hydroxides, carbonates, or bicarbonate salts to the reaction media with both water based reaction systems alone, or when added to an enhancer-containing system. At a ratio of 0.5 $K_2CO_3$:1.0 Urea in a 40% urea solution, rates similar to that of vanadium oxide are obtained.

EXAMPLE 3

The hydrolysis reaction was operated in a continuous mode in which a solution of 40 percent urea in water was pumped at a controlled rate into the hydrolysis reactor described in Example 1, in which it was heated to temperatures up to 155° C. with the heat "input" controlled to maintain a pressure of 75 psig. The ammonia-containing product gas stream formed discharged through a needle valve at a controlled flow rate equivalent to 0.2 g/min. The ammonia-containing product gas generated was absorbed in a measured amount of water and analyzed at regular intervals for buildup of ammonia. A constant level of the urea solution was maintained in the reactor by injection of urea feed solution into the bottom of the hydrolysis reactor at a rate of 0.9 ml/min., which essentially matches the ammonia generation rate of 0.2 g/min. and the amount of urea injected.

EXAMPLE 4

The urea hydrolysis reactor and system described in Example 3 was operated in a continuous manner in conjunction with a pilot plant combustion gas generator to demonstrate the effectiveness of ammonia derived from the hydrolysis of urea for the actual removal of nitrogen oxides from a typical combustion gas stream when using a regular commercial SCR catalyst. The temperature of the nitrogen oxides containing combustion gas was adjusted to approximately 750° F. at the catalyst inlet. At a concentration of 200 ppm NOx in the inlet feed gas to the catalyst section the concentration of nitrogen oxides in the leaving combustion gas was reduced to the 18 ppm level, to give a removal efficiency of better than 90%. The urea hydrolysis section generated ammonia smoothly at a constant rate as evidenced by the constancy of the nitrogen oxides concentration over an extended period of operation. When the system was operated with an aqueous ammonia solution as the source of ammonia and the same flue gas stream and catalyst, the removal of nitrogen oxides was the same.

EXAMPLE 5

Plant operating data developed for an industrial scale 110 MW gas fired turbine combined cycle power plant are shown in Table 2. The plant currently uses hazardous anhydrous ammonia that is stored in a 25 ton storage vessel, which provides a 30 day supply. Employment of the subject invention eliminates the need for storage of anhydrous ammonia.

Urea is available commercially in solid form or as a 50% solution that can be delivered to the plant site by tank car or truck. For the 50 percent urea solution, a 11,000 gallon storage tank provides 30 days capacity. The 50% urea solution from the storage tank is then diluted to 40% by feeding in deionized water at a matching rate as the urea is fed to the hydrolysis reactor.

The hydrolysis reactor is heated with steam (200 PSIG) and is operated at an approximate temperature of 150° C. and an operating pressure of 75 psig. The reactor pressure is controlled by the heat input to the reactor and the gas takeoff rate is controlled by an adjustable control valve, which adjusts to match the required amount for control of the nitrogen oxides in the combustion gas stream. The control valve and discharge piping are heated to above 80° C. The product gas stream is diluted with hot compressed air prior to introduction into a distribution grid in the flue gas duct.

TABLE 2

Operating Data for SCR System

| Inlet Flue Gas | |
|---|---|
| Flow Rate | 10513 scfs |
| Inlet $NO_x$ | 30 ppm |
| Urea Feed Solution | |
| Concentration | 40% |
| Urea Feed Rate | 76 lb/hr |
| Input Treating Gas | |
| Ammonia Feed | 43 lb/hr |
| Carbon Dioxide | 55 lb/hr |
| Water Vapor | 90 lb/hr |
| Leaving Flue Gas | |
| $NO_x$ | 4.5 ppm |
| $O_2$ | 14.8% |
| C | 0.8 ppm |
| $H_2O$ | 13.0% |

It is to be understood that the examples shown are given by way of illustration and are not to be construed as limiting the invention. A similar process may be used for other processes requiring ammonia.

The above descriptions are for teaching the person of ordinary skill in the art how to practice the present invention and it is not intended to detail all of those modifications and variations of it which will become apparent to the skilled worker upon reading the description. It is intended, however that all such obvious modifications and variations be included within the scope of the present invention which is defined by the following claims.

The invention claimed is:

1. A method adapted to provide a pressurized gas stream for an external use in removing nitrogen oxides from a combustion gas stream by SNCR (Selective Non-Catalytic Reduction), or SCR (Selective Catalytic Reduction), the method comprising:
  a) establishing in a reactor an aqueous solution of urea or mixtures of urea containing biuret and/or ammonium carbamate, and hydrolyzing the urea therein under pressures of about 20–500 psig to produce: (i) a gaseous product stream of ammonia, carbon dioxide and water sufficient for the external use in step d), the rate of production of ammonia being controlled thermally and by the quantity of solution in the reactor, and (ii) a residual liquid phase reaction medium;
  b) separating the gaseous product stream from said residual liquid phase medium;
  c) retaining the residual liquid phase medium in the reactor and/or recycling at least a portion of the residual liquid phase medium back into the reactor or a urea dissolver; and
  d) feeding the separated gaseous product and stream for the external use at a controlled rate which is approximately the amount necessary to the demand of said external use in removing said nitrogen oxides.

2. The method of claim 1 wherein:
  a) the gaseous ammonia and carbon dioxide formed in step a are separated from the residual liquid phase medium while under the operating pressure in a separation device; and
  b) the residual liquid phase medium is recycled from the separation device back into the reactor, or urea dissolver, for further conversion of any unreacted urea, biuret and intermediate ammonium carbamate therein.

3. The method of claim 1 in which the hydrolysis reaction is carried out under non-catalytic conditions.

4. The method of claim 1 in which the reaction rate to form the gaseous ammonia-containing product is enhanced by inclusion in the aqueous solution of a composition which increases the rate of the hydrolysis of urea and is selected from the group consisting of:
  a) Oxides or ammonium or alkali metal salts or hydroxides of elements in Groups III-B, IV, V and VI-A of the Periodic Chart Of The Elements, or the hydroxides, carbonates or bicarbonates of Group I;
  b) Acidic or Basic Ion-exchange resins, and
  c) Activated carbon, silica or alumina.

5. The method of claim 1 wherein said solids content in the reactor is from about 10% to 76% solids.

6. The method of claim 1 in which the gaseous ammonia and carbon dioxide product being discharged are maintained at a temperature above 60° C.

7. The method of claim 1 in which a portion of the water vapor in the ammonia and carbon dioxide product stream leaving the reactor is removed by cooling the product gas stream in a condenser while under pressure.

8. The method of claim 7 in which the water removed from the gaseous ammonia and carbon dioxide gaseous product stream is recovered and recycled back to the reactor or used to replace water used in the preparation of the urea solution.

9. The method of claim 7 in which the urea solution is used as the coolant to the condenser, following which the heated solution is delivered to the reactor.

10. The method of claim 1 in which the pressure within the reactor is monitored and controlled by the gas phase pressure, and gas phase pressure gauge, control valve and connection lines are provided and are heated to above 60° C.

11. The method of claim 10 in which the pressure within the reactor is monitored and controlled by the liquid phase pressure, the pressure gauge and connection line being at a temperature from ambient to the temperature of the reactor solution.

12. The method of claim 1 in which an emergency pressure relief valve is connected to a tank containing water, said tank containing sufficient cold water to cool the reactor solution discharge to stop the hydrolysis reaction.

13. The method of claim 1 in which a reactor discharge control valve is provided and is regulated to provide a controlled flow rate of the gaseous ammonia and carbon dioxide product stream which matches the amount of nitrogen oxides in said combustion gas stream.

14. The method of claim 1 in which the product ammonia and carbon dioxide gas stream is mixed with a dilution gas, said dilution gas being comprised of air, steam or flue gas, or mixtures thereof, prior to said external use.

15. The method of claim 1 in which the heat required for the hydrolysis reaction is derived from said hot combustion gas stream.

16. The method of claim 1 in which the aqueous solution in the reactor is formed by mixing urea with water and feeding the solution to the reactor.

17. A method adapted to provide a pressurized gas stream for an external use in removing nitrogen oxides from a combustion gas stream by SNCR (Selective Non-Catalytic Reduction), or SCR (Selective Catalytic Reduction), the method comprising:
   a) establishing in a reactor an aqueous solution of urea or mixtures of urea containing biuret and/or ammonium carbamate, and hydrolyzing the urea therein under pressures of about 20–500 psig and at temperatures sufficient to produce: (i) a gaseous product stream of ammonia, carbon dioxide and water sufficient for the external use in step d), the rate of production of ammonia being controlled thermally and by the quantity of solution in the reactor, the temperature being in the range of at least 110° C. up to about 300° C., and (ii) a residual liquid phase medium;
   b) separating the gaseous product stream from said residual liquid phase medium;
   c) retaining the residual liquid phase medium in the reactor and/or recycling at least a portion of the residual liquid phase medium back into the reactor or a urea dissolver; and
   d) feeding the separated gaseous product and stream for the external use at a controlled rate which is approximately the amount necessary to the demand of said external use in removing said nitrogen oxides.

18. A method adapted to provide a pressurized gas stream for an external use in removing nitrogen oxides from a combustion gas stream by SNCR (Selective Non-Catalytic Reduction), or SCR (Selective Catalytic Reduction), the method comprising:
   a) establishing in a reactor an aqueous solution of urea or mixtures of urea containing biuret and/or ammonium carbamate, and hydrolyzing the urea therein under pressure of about 20–500 Psig and at temperatures sufficient to produce: (i) a gaseous product stream of ammonia, carbon dioxide and water sufficient for the external use in step d), the rate of production of ammonia being controlled thermally and by the quantity of solution in the reactor, the solids content of said aqueous solution being from about 1% to 76% by weight, and (ii) a residual liquid phase medium;
   b) separating the gaseous product stream from said residual liquid phase medium;
   c) retaining the residual liquid phase medium in the reactor and/or recycling at least a portion of the residual liquid phase medium back into the reactor or a urea dissolver; and
   d) feeding the separated gaseous product and stream for the external use at a controlled rate which is approximately the amount necessary to the demand of said external use in removing said nitrogen oxides.

19. A method adapted to provide a pressurized gas stream for an external use in a combustion gas stream by SNCR (Selective Non-Catalytic Reduction), or SCR (Selective Catalytic Reduction), the method comprising:
   a) establishing in a reactor an aqueous solution of urea or mixtures of urea containing biuret and/or ammonium carbamate, and hydrolyzing the urea therein under pressures of about 20–500 psig and at temperature sufficient to produce: (i) a gaseous product stream of ammonia, carbon dioxide and water sufficient for external use in step d), the rate of production of ammonia being controlled thermally and by the quantity of solution in the reactor, the temperature being in the range of at least 110° C. to about 300° C., the solids content of said aqueous solution being from about 1% to 76% by weight, and (ii) a residual liquid phase medium;
   b) separating the gaseous product stream from said residual liquid phase reaction medium;
   c) retaining the residual liquid phase reaction medium in the reactor and/or recycling at least a portion of the residual liquid phase medium back into the reactor or a urea dissolver; and
   d) feeding the separated gaseous product and stream for the external use at a controlled rate which is approximately the amount necessary to the demand of said external use in removing said nitrogen oxides.

20. The method of claim 1, 17, 18, or 19 in which the conditions of operation in the reactor are carried out within the temperature range of about 110√ C. to about 180° C., pressure range of about 20 PSIG–500 PSIG, and the residual liquid phase medium contains urea.

21. The method of claim 20 wherein the residual liquid phase medium is recycled back into the reactor or urea dissolver for further hydrolysis of the urea therein.

22. The method of claim 1, 17, 18, or 19 wherein the demand is for removal of only a portion of the nitrogen oxides.

23. The method of claim 1, 17, 18, or 19 wherein the aqueous solution in the reactor is held at an essentially constant volume.

* * * * *